Patented Mar. 9, 1948

2,437,261

UNITED STATES PATENT OFFICE 2,437,261

CONDENSATION PRODUCTS OF CHOLESTERYL ESTERS WITH POLYETHYLENE GLYCOL AND PROCESS FOR PRODUCING SAME

Louis L. Lerner, Chicago, Ill., assignor to Consolidated Royal Chemical Corporation, Chicago, Ill., a corporation of Delaware No Drawing. Application October 9, 1944,
Serial No. 557,945

21 Claims. (Cl. 260—397.2)

The present invention relates generally to the production of condensation reaction products which are derivatives of cholesterol, of saturated straight-chain aliphatic monocarboxylic acids, and of polyethylene glycols. In particular it relates to condensation products of one or more of cholesteryl esters of one or more of such aliphatic acids with one or more of the polyethylene glycols.

Cholesterol is a valuable substance in nature and a constituent of natural fatty material. For example, it occurs as cholesteryl stearate and as other esters in lanolin, the fat derived from lamb's wool, which fat is a valuable pharmaceutical product used in ointments, skin creams and the like. Cholesterol has a supposedly known structural formula, and according to Merck's Index (5th edition) it is empirically: $C_{27}H_{46}O$, wherein there is one —OH group, giving cholesterol the properties of an alcohol and the property of forming esters.

Although esters with fatty acids are found in nature, it is not known that they have been synthesized nor that the stearic acid ester has been so made. In my co-filed application Serial No. 557,944, filed October 9, 1944, now abandoned, I have described the manufacture of such fatty acid esters. By such process esters, including cholesteryl stearate, are readily produced. Where cholesterol is represented as an alcohol by the formula: X—OH (X being the cholesteryl radical), and the fatty acid is represented by the formula R—COOH, (R being the radical $C_{17}H_{35}$— in the case of stearic acid), the ester between them is represented by the formula:

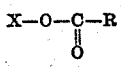

It is an object of the present invention to condense a cholesteryl ester of a fatty acid with polyethylene glycol by one or more reactions of dehydrating condensation, including one at least between the glycol and the ester.

It is a particular object of the present invention to react cholesteryl ester of fatty acid with one or more of the polyethylene glycols.

It is an object of the invention to produce one type of product which is oil-soluble and water dispersible; or to produce another type of product which is water-soluble and oil-dispersible; or to produce both types simultaneously.

It is an object of the invention to produce new and valuable ingredients for skin creams and lotions, shaving creams, hand lotions, medicating ointments, and various detergent compositions.

It is also an object of the invention to control the character of the resulting reaction mass by control of the ratio of the ester compound to the glycol compound, taking into consideration the stereo-chemical relationships involved, depending upon the fatty acid involved and the average or exact molecular weight of the polyethylene glycol.

It is also an object of the invention to carry out the condensation in one or more stages or reactivity releasing water, according to the nature and amount of materials employed.

Various other and ancillary objects and advantages of the invention will be apparent from the following descripiton and explanation of the invention which is set forth in the accompanying claims.

Cholesteryl ester of lauric acid is a yellow waxy-to-oily crystalline semi-translucent mass melting at about body temperature. It may be made in accordance with the invention set forth in my co-filed application Serial No. 557,944, filed October 9, 1944. In said application it is pointed out that other saturated monocarboxylic aliphatic acids having from 12 to 18 inclusive carbon atoms may be used to esterify cholesterol. Commercial stearic acid may be used, varying generally in composition and about as follows:

| | Per cent by weight |
|---|---|
| Lauric acid | 0 to .2 |
| Myristic acid | 0 to 1.8 |
| Palmitic acid | 52 to 64 |
| Stearic acid | 34 to 44 |
| Oleic acid | 2 to 4 |

Using commercial stearic acid, the resulting ester will vary in its melting point as a result of variations in the fatty acid, and as a result of processing conditions in esterifying. However, the general useful properties of the ester, and its activity as a reagent for the present invention, are not significantly altered by such variation in melting point. The cholesteryl ester of commercial stearic acid, as it has been used in the present invention, has varied from 44° to 48° C. in its melting point.

According to the present invention, cholesteryl esters of said fatty acids are reactive with diethylene glycol and the higher polyethylene glycols including those having very high molecular weights, at least in the vicinity of 4000 to 6000. Some polyethylene glycols are available on the market today, and some are mixtures of various polyethylene glycols.

It is not intended above to imply that the said cholesteryl esters are not reactive with ethylene glycol. They are, and by the same procedure as used for the present invention but with different results, yielding products not useful as herein described as resulting from reaction with diethylene glycol and higher polyethylene glycols.

In order to explain the invention certain extremes within the present invention are first presented in general terms. I have found that there is a reaction between two molecules of diethylene glycol and one molecule of cholesteryl ester, whereby one molecule of water is readily lost, forming what I believe cross-chain compounds. I have found the same to be true for some of the higher polyethylene glycols. In the case of using higher polyethylene glycols, whereby certain steric hindrance is overcome, the reaction may be conducted so that two molecules of the ester react with two molecules of the polyglycol forming what I believe to be doubly crossed cyclic compounds.

When two moles of the lower polyethylene glycols condense with one mole of the cholesteryl ester, the resulting product is oil-soluble and water dispersible. When two to four moles of the higher polyethylene glycols and two moles of the cholesteryl ester condense, the product is water-soluble and oil-dispersible.

The foregoing reactions may be effected by heating the reacting materials together in an anhydrous mixture, and raising the temperature of the mixture sufficiently at atmospheric pressure, to drive off the resulting generated water, and then cooling the mass when the water removed corresponds to the reaction desired. The loss of water is an indicator of the progress of or completion of the reaction. The reaction can be arrested before completion, to yield a mixture of products, useful nevertheless, variously containing the initial unreacted reagents, intermediate products, and final products.

But I have also discovered that where the condensation is performed to effect reaction according to the 2 to 1 ratio simultaneously with reaction according to the 2 to 2 ratio, the end product as a liquid separates into two layers, the top layer being substantially all the product created by the 2 to 1 ratio reaction, and the bottom layer being substantially all the product resulting from the 2 to 2 ratio reaction. The top layer of material is a dark brown viscous amorphous mass when cold, while the bottom layer, when cold is a light brown waxy crystalline mass.

Without committing myself to any definite theory as to the chemical constitution of the products, or to the mechanism of the reactions, the following is offered as the best explanation presently postulated:

Cholesteryl ester is herein represented by the formula:

(1)
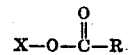

as previously described. The linkage lines are here made long, to indicate the large complex structure for X and especially the long chain for R, whereby, in the kinetic molecule, the grouping

is somewhat fenced in.

Where the preferred reaction is carried out with diethylene glycol, it is postulated to be as follows:

(2) 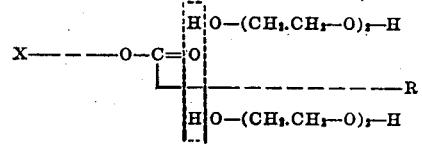

giving (3) 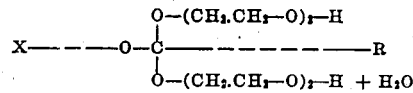

Where the reaction is carried out with high-molecular weight polyethylene glycols, such as 1500 to 6000, wherein the units of ether linkages are in part represented by $m$ or $n$ (which may be the same or different in value), the reaction appears to be as follows:

(4) 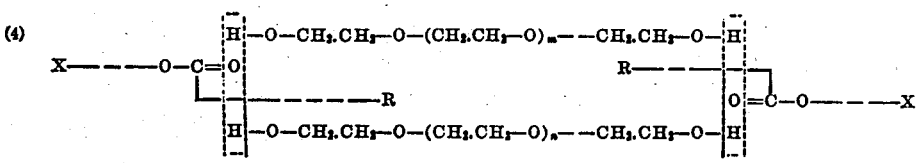

giving (5) 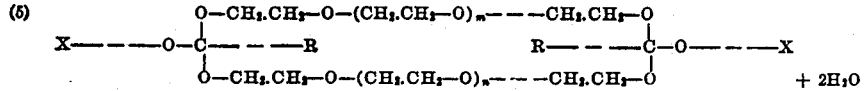

Where the reaction is carried out with a polyethylene glycol of a chain length seemingly long enough to reach beyond the radical R, as for example, with hexaethylene glycol when R results from commercial stearic acid, 4 moles of glycol readily react with 2 moles of ester giving 4 moles of water, thus:

(6) 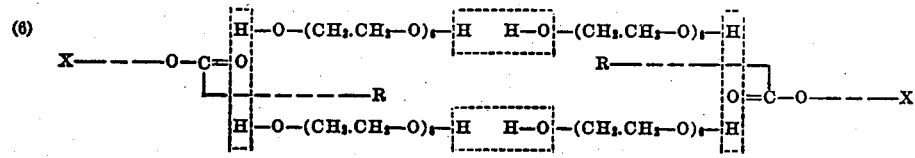

giving (7) 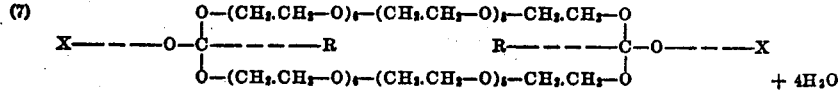

The types of product (5) and (7) are alike in properties and in apparent chemical structures, because the resulting polyethylene glycol portion of the molecule can span two of the aliphatic acid radicals. But where the polyethylene glycol chain is not long enough to reach the end of the aliphatic radical, as graphically represented, and as borne out by calculations of atomic disances in such molecules, there can be an additional condensation between the first-formed products, which condensation is believed to be a chain-like one of ether-condensation between free ends of the polyethylene glycol groups of two independent molecules thus:

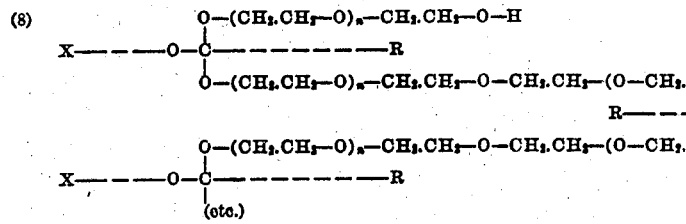

This reaction takes place in some cases, usually in a second stage of heating and after the primary or first stage reaction, which latter is of the character of Reaction (2), at a more elevated temperature and with more difficulty, but with very little change in the general properties of the end product, compared to the end product of the first stage. How extensively it occurs is of course unknown. It may continue for many molecules, even to the point of closing with the open —OH shown at the top of the Compound (8). In any event, it approaches the production of $2x$ moles of water for reaction between $2x$ moles of polyethylene glycol and $x$ moles of ester. This is the same degree of water-production as in Reaction (6).

Recognizing that the large structure of X and the long chain of R are kinetically active in Formula (3), the two new side chains derived from the diethylene glycol seem too short to reach beyond the parts X or R to react with another molecule of cholesteryl ester as in the manner shown in Reaction (4). The chain of R is from 11 to 17 carbons long, indicating that the chain length of the glycol may need to be in the vicinity of about double that length to reach beyond the R molecule of the cholesteryl ester and to another such molecule, when oriented as illustrated.

When the polyethylene glycol chain is long, and when it has a molecular weight of 1500 to 6000, it has been seemingly long enough to tie into two molecules of cholesteryl ester of commerical stearic acid, and to do this twice, as shown in Formulas (4) and (5). Owing to the present impossibility to secure defined polyethylene glycols in the whole range, it is presently impossible to check these postulations and to determine that boundary line at which the reaction changes from Formula (2) to Formula (4). However, the process is the same regardless of the fact that the products are different but related. The test of such postulation is further complicated by the fact that during the condensation two lower polyethylene glycols, or terminals thereof as obtain in a product of the kind shown at (3), bridge by an etherifying condensation to form a higher polyethylene glycol derivative. Thus, when I have condensed two moles of cholesteryl ester of commercial stearic acid with four moles of hexaethylene glycol by Reaction (6), and when four moles of water of condensation are obtained, the product (7) is oil-soluble and water-soluble and has those properties which characterize the product (5) of Reaction (4). According to the proportion of initial reactants the product should be comparable to product (3) made by Reaction (2). But because 4 moles of water are formed, instead of two as called for by the initial proportions and by Reaction (2), the extra water, and the different nature of the product (7) compared to product (3), indicate that the theory is consistent with known facts of steric hindrance.

Referring to reaction product (3), it is postulated that when the polyethylene glycol chain thereof is of a length to allow the two free ends thereof to project beyond the remainder of the molecule (illustrated in Reaction (6) as being the radical R), they condense with two like projecting terminals of a like molecule, and form a compound of the type (5). The latter is also formed when the initially employed polyethylene glycol has a chain length to include two lengths of radicals from two esters (illustrated as two radicals —R), according to Reaction (4) to form product (5).

In Reaction (4) 2 moles of ester and 2 moles of the suitably long polyethylene glycol form the cyclic-type of Compound (5) with liberation of 2 moles of water. If 4 moles of the same polyethylene glycol and two moles of the ester are employed, they will also form a cyclic-type Compound (7), but by Reaction (6), liberating 4 moles of water. The two cyclic compounds have the same general type of properties, but the form (7) has longer glycol-ether chains.

When the glycol-ether chains in compounds of the type (3) are too short to bridge across as in Reaction (6), they may be forced by additional heating, as in the said second stage, to condense to form products of the type shown at (8).

Products which theoretically correspond to products (5) and (7) may be heated to more elevated temperatures and for longer times to effect additional generation of water. This may be explained by considering the grouping

to be rotatable on the —O—C—O— axis (which fits well known theories of stereochemistry), so that the radicals —R of two molecules at one end are parallel and opposite to like parallel radicals —R of the other ends. These 2 pairs of radicals —R form two sides of a quadrilateral molecule of which the 2 pairs of 2 parallel glycol chains complete the structure. In this arrangement the terminal —CH₃ groups of the radicals —R may condense directly with the terminal oxygen atoms of the said —O—C—O— axes, liberating water and forming a doubly cyclic compound; or the terminal groups —CH₃ may become oxidized forming water, at the high temperatures employed.

The resulting oxidized groups, possibly

—COOH, may readily condense with the terminal —O— atoms of said axes, forming water of condensation.

A second possibility is that two terminal —CH₃ groups oxidize to form COOH groups, which then form an anhydride union, liberating water.

One or more of these possibilities may occur. But, whatever does occur, the products remain water-soluble, and oil-dispersible, being harder and more crystalline in structure, then the products which correspond to those illustrated as (5) and (7).

The postulation of the initial condensation reactions is further supported by analogy. Organic acids are represented as (9)          Y.COOH wherein Y is hydrogen or some organic radical. Textbooks postulate a theoretical "ortho acid" which is the hydrated form of Y.COOH, namely:

(10)

Tri-ethers of some "ortho acids" are known to exist, and their production from methyl alcohol would be represented thus:

(11)
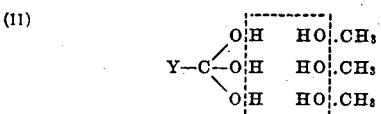

giving

(12)
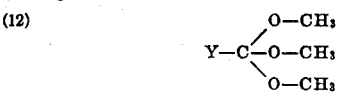

The initial compounds of the present invention, as above postulated, may thus correspond to tri-ethers of ortho-aliphatic acid. Compound (3) is acyclic, or cross-chain, and Compounds (5) and (7) are cyclic and doubly-crossed. Compound (8) is cross-chain and zig-zag. Later-stage reaction products have unknown configurations.

From the theoretical postulations and from the experimental results which support them, it may be said that the invention divides into three general species, based upon the molecular weight or chain-length of the polyethylene glycol, for each precise length of straight chain for the fatty acid of the ester.

Species A

*Stage 1.*—2 molecules of polyethylene glycol of length insufficient to reach beyond the fatty acid radical of the ester, combine with 1 molecule of the ester, to form 1 supposedly cross-chain molecule and 1 molecule of water.

*Stage 2.*—The resulting mass of stage 1 on further heating reacts with itself forming up to 1 molecule of water per molecule of stage 1 product, and a substance which is like a "polymer" of stage 1 product with little change of properties by the addition condensation.

Reaction (2) and product (3) represent stage 1, and the zig-zag product (8) represents stage 2.

Species B

*Stage 1.*—4 molecules of polyethylene glycol of length sufficient to reach beyond the fatty acid radical of the ester, but insufficient to span 2 such fatty acid radicals, react with 2 molecules of the ester, to form a supposed cyclic doubly-crossed molecule, and 4 molecules of water. This is illustrated by Reaction (6) and product (7).

*Stage 2.*—The resulting mass of stage 1 on further heating reacts with itself forming up to 4 more molecules of water, and a substance which is oil-dispersible and water-soluble. The nature of the molecule has been suggested herein-above.

Species C

*Sub a, stage 1.*—2 molecules of polyethylene glycol of length sufficient to span 2 fatty acid radicals, react with 2 molecules of the ester, to form 1 supposed cyclic doubly-crossed molecule and 2 molecules of water.

This is illustrated by Reaction (4) and product (5).

*Sub a, stage 2.*—The resulting mass of stage 1 on further heating reacts with itself forming in a distinct stage, 2 more molecules of water. This generation eases off, and then as more heat is applied a third stage then begins.

*Sub a, stage 3.*—The resulting mass of stage 2 on further heating reacts forming again 2 molecules of water, after which further heating leads to decomposition of the mass. The product at the end of the third stage is still oil-dispersible and water-soluble.

*Sub b, stage 1.*—4 molecules of polyethylene glycol of length sufficient to span two fatty acid radicals react with 2 molecules of ester, to form 1 supposed cyclic doubly-crossed molecule and 4 molecules of water.

This is illustrated by Reaction (6) modified by use of a longer-chain glycol of the kind used for Reaction (4), forming a product like product (5) but with longer glycol-ether links.

*Sub b, stage 2.*—The resulting mass of stage 1 on further heating loses 4 more molecules of water. Additional heating effects decomposition of the mass. The product of stage 2 is still slightly oil-dispersible and water-soluble.

Summary

The following Table I summarizes the foregoing:

Table I

| Species | Mol. of Glycol | Mol. of Ester | Mol. of H₂O | Supposed Molecule |
|---|---|---|---|---|
| A Stage 1 | $4x$ | $2x$ | $2x$ | Cross. |
| A Stage 2 | $4x$ | $2x$ | $4x$ | Zig-Zag? |
| B Stage 1 [1] | $4x$ | $2x$ | $4x$ | Cyclic. |
| B Stage 2 [2] | $4x$ | $2x$ | $8x$ | Doubly cyclic? |
| C Sub a: | | | | |
|   Stage 1 | $2x$ | $2x$ | $2x$ | Cyclic. |
|   Stage 2 | $2x$ | $2x$ | $4x$ | Doubly cyclic? |
|   Stage 3 | $2x$ | $2x$ | $6x$ | ? |
| C Sub b: | | | | |
|   Stage 1 [1] | $4x$ | $2x$ | $4x$ | Cyclic. |
|   Stage 2 [2] | $4x$ | $2x$ | $8x$ | Doubly cyclic? |

[1] Same reaction.
[2] Same reaction.

Experimentally, where commercial stearic acid is used to esterify the chloresterol, the use of nonaethylene glycol falls in species B, but where the more sharply defined cholesteryl laurate is used, the use of half as much nonaethylene glycol falls in species C, sub a. Also, experimentally, using the cholesteryl ester of commercial stearic acid, the reaction follows species A, stage 1, beginning with diethylene glycol through tetraethylene glycol (commercially provided) and then follows species B when commercial hexaethylene glycol and higher ones at least up to nonaethylene glycol are employed. Those polyethylene glycols having an average and actual molecular weight of 1500 and over react according to species C, and are employed preferably according to C sub *a*, stage 1.

The Compounds (3) and (8) are oil-soluble and water-dispersible, while the Compounds (5) and (7) are water-soluble and oil-dispersible. Generally, —OH and —O— groups tend to impart water-soluble characteristics to compounds, and the glycols of the formula $HO(CH_2.CH_2O)_nH$ are water-soluble. In the present invention the Compounds (5) and (7) have relatively higher contents of these water-solubilizing structures than do Compounds (3) and (8). The hydrocarbon radicals X and R give the oil-solubility and oil-dispersibility. Thus, by control, mixtures may be formed having a wide range of properties toward water and toward oil.

In carrying out the invention the procedure may be standardized for standardized materials, recognizing particularly the variability of the commercial polyethylene glycols, as well as fatty acids. The materials are mixed and heated, the loss of water from the mass permitting a temperature rise. In developing the process water evolved has been measured during the reaction, and the volume corrected for water derived only physically from the ingredients, especially from the polyethylene glycol. These are hygroscopic and contain water. Running a blank distillation with the polyethylene glycol material permits correcting for its water content, whereby water actually driven off as vapor may be corrected for that deriving from the reaction, to give by difference the water formed, as a measure of the extent of reaction. The reaction can be controlled, and stopped as desired, complete, or incomplete, merely by calculating the water to be developed, from the materials used, and by measuring as a condensate, the water actually evolved from the reaction.

The invention is illustrated by the following examples in which the parts are given by weight:

Example 1

53.1 grams of diethylene glycol (½ gram-mole) and 167.7 grams of cholesteryl ester of commercial stearic acid (¼ gram-mole) are heated together in a suitable distilling vessel, preferably of glass, to a temperature of about 262° C. (uncorrected), and then cooled, while in the meantime a condensate of 4½ grams (¼ gram-mole) of water has been collected.

The product is a light brown granular semisolid at room temperature, softening with heat. It is oil-soluble, water-adsorbent and water-dispersible. For example, 1 part of the product may be heated with 10 parts of mineral oil to form a clear oily mixture. Then 10 parts of water may be slowly added with emulsifying agitation, making a water-in-oil type of dispersion. This will receive additional water by emulsification and at some point will reverse its type to a water-in-oil emulsion. The new product of the present invention is the dual-acting emulsifying agent permitting this.

As a component of an oil or fat composition, the new product may be employed to bind a certain amount of water homogeneously into the composition. It is hydrophilic.

Example 2

95 grams (½ gram-mole) of tetraethylene glycol and 167.7 grams (¼ gram-mole) of cholesteryl ester of commercial stearic acid, were heated as in Example 1, for 35 minutes producing ¼ mole of water (4½ grams), and a final temperature of about 327° C., according to species A, stage 1, described above. Then additional heat for 55 minutes more was required to remove a second ¼ mole of water, and a final temperature of 353° to 356° C., according to species A, stage 2.

The product is a dark brown oily liquid dispersible in oil, water adsorbent, and water dispersible.

Example 3

116 grams of hexaethylene glycol (molecular weight average 300) corresponding to .4 gram-mole, and 134.2 grams of cholesteryl ester of commercial stearic acid (.2 gram-mole) were heated to a final temperature of 369° C. while collecting .4 mole of water. The product is a brown heavy oily liquid, oil-soluble, water-soluble, and water dispersible. This corresponds to species B, stage 1.

Example 4

266.7 grams of polyethylene glycol (average molecular weight 4000), corresponding to 1/15 gram-mole, and 22.4 grams of cholesteryl ester of commercial stearic acid (corresponding to 1/30 gram-mole) are heated to a final temperature of about 335° C., with removal of 2/15 moles of water. After the first 1/15 mole of water was removed in about 12 minutes, the reaction slowed down, indicating the end of species C, sub *b*, stage 1. Then with more heat for an additional 24 minutes, the second installment of water came over, indicating the end of the corresponding stage 2.

The product was a brown wax-like solid having a melting point of about 56° C., water-soluble, oil-adsorbent, and water dispersible.

This is the same type of reaction as species B, stages 1 and 2, the only difference being in the lengths of the glycol chains.

Example 5

57.8 grams of nonaethylene glycol (.14 gram-mole) and 80.2 grams of cholesteryl laurate (.14 gram-mole) were heated in 45 minutes to 369° C., with loss of .14 mole of water. The product is a light brown granular- to semi-solid softening at body temperature, which is oil-soluble and water soluble.

This is species C, sub *a*, stage 1.

Example 6

150 grams of polyethylene glycol (actual molecular weight about 1500), corresponding to .1 gram-mole, and 56.9 grams of cholesteryl laurate corresponding to .1 gram-mole. were heated for 45 minutes, to a final temperature of about 352° C., with loss of .1 gram-mole of water. The product is a light tan semi-solid like petroleum jelly, water-soluble and oil-dispersible. This is again species C, sub *a*, stage 1.

Example 7

200 grams of polyethylene glycol (average molecular weight 4000) corresponding to .05 gram-mole, and 33.5 grams of cholesteryl ester of commercial stearic acid, corresponding to .05 gram-mole, were heated for 45 minutes to a final temperature of about 335° C., with loss of .05 gram-mole of water. The product is a brown solid with a congealing point of 46°–47° C., which is water-soluble, and slightly oil-dispersible.

This is species C, sub *a*, stage 1.

Example 8

187.5 grams of polyethylene glycol (actual molecular weight about 1500) corresponding to ⅛ gram-mole, and 81.6 grams of cholesteryl ester of commercial stearic acid, corresponding to ⅛ gram-mole, were heated for 45 minutes to a final temperature of about 291° C., with loss of ⅛ gram-mole of water. The product is a brown semi-solid softening at slightly above body temperature, water-soluble, and oil-dispersible. This is also species C, sub a, stage 1.

*Example 9*

166.9 grams of polyethylene glycol (actual molecular weight about 1500) corresponding to .1112 gram-mole, and 74.61 grams of cholesteryl ester of commercial stearic acid, corresponding to .1112 gram-mole, were heated for 27 minutes to a final temperature of about 345° C., with loss of .3336 gram-mole of water, evidenced in its loss by three distinct successive stages of .1112 gram-mole in each stage, at increasing temperatures as water is lost, with a definite lull in rate of loss between stages. The product is a semi-hard brown wax-like material, oily to the touch, having an approximate melting point of 36° C., water-soluble, and oil-dispersible.

This corresponds to species C, sub a, stage 3, at the end of the reaction, and includes the earlier stages 1 and 2.

*Example 10*

95 grams of tetraethylene glycol (molecular weight about 200) corresponding to .5 gram-mole, and 167.7 grams of cholesteryl ester of commercial stearic acid corresponding to .25 gram-mole, were heated for 45 minutes to a final temperature of about 326° C., with loss of .25 gram-mole of water. The product is a brown granular jelly-like substance, melting slightly below body temperature, water-dispersible, and oil-soluble.

This is species A, stage 1.

*Example 11*

205 grams of nonaethylene glycol (molecular weight about 400) corresponding to .5 gram-mole, and 167.7 grams of cholesteryl ester of commercial stearic acid corresponding to .25 gram-mole, were heated for 45 minutes to a final temperature of about 369° C., with loss of .5 gram-mole of water. The product is a brown semi-solid melting about body temperature, and is oil-soluble, water-soluble and water-dispersible.

This is species B, stage 1. It is noted that Example 5 uses the nonaethylene glycol, but because the fatty acid radical of the ester is shorter in Example 5 than in the present example, the case of Example 5 is species C, sub a, stage 1.

*Example 12*

There is a commercial form of polyethylene glycol having 50% by weight of such material of about 300 molecular weight, referred to as A-material, and 50% of such material having about 1500 molecular weight, referred to as C-material. Using 150 grams of the commercial material, there are 75 grams of A-material (.25 gram-mole) and 75 grams of C-material (.05 gram-mole). These letters correspond to the species A and C with reference to cholesteryl ester of commercial stearic acid. For the A-material ⅛ gram-mole of such ester is required for species A, stage 1, reaction, liberating ⅛ gram-mole of water. For the C-material .05 gram-mole of ester is required for species C, sub a, stage 1, reaction, liberating .05 gram-mole of water. These total a use of 7/40 mole of the cholesteryl ester (117.4 grams) for liberation of 7/40 gram-mole of water.

Therefore, 150 grams of said mixed polyethylene glycol and 117.4 grams of cholesteryl ester of commercial stearic acid, were heated for 27 minutes to a final temperature of 295° C., with liberation of 3.2 grams of water. Thus the reaction was carried through the first stage.

The resulting hot liquid product was removed and cooled. A separation into two layers was noted, the separation being in a weight ratio of 3 to 2. The larger top portion was of the type corresponding to the lowest molecular weight, and the smaller bottom portion was of the type corresponding to the higher molecular weight. When this same material, that is both components, was put back into the distilling vessel and heated to effect a removal of water corresponding to both the second and third stages, as previously shown, the extra water removed was 4.0 grams. At this point the reaction ceased and the mixture boiled smoothly. The boiling point under these conditions was 352° C. uncorrected. The resulting material was then removed from the vessel and permitted to cool. No separation manifested itself upon cooling and the cold material was a homogeneous petrolatum-like mixture having the identical characteristics of petrolatum. Under the conditions and theories previously described, there should be no separation after the latter stages have been reached, as is shown by the compound, because complete cyclization occurs and all the compounds involved become similar in structure. Theory and practice are in agreement. This material is almost identical to lanolin in its properties, with the exception that it has greater hydrophilic tendencies. It is also dispersible by and in oil.

It is pointed out that this example involves several species of reactions at once, each resulting in its characteristic type of product. These products are so distinct, that to a degree, they separate and provide two layers, one of which is oil-soluble and water-dispersible, the other being water-soluble and oil-dispersible.

From the foregoing it will be understood that the present invention may be carried out in numerous ways without departing from the spirit and scope of the appended claims.

I claim:

1. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing said ester and said polyethylene glycol to a temperature and for a time substantially to effect the said generation of water, and by removing from the mass the resulting water in the form of vapor.

2. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing for every 2 moles of said ester from 2 to 4 moles of said polyethylene glycol to a temperature and for a time substantially to effect the said generation of water, and by removing from the mass the resulting water in the form of vapor.

3. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing for every 2 moles of said ester at least 2 moles of said polyethylene glycol to a temperature and for a time substantially to effect the said generation of water, and by removing from the mass the resulting water in the form of vapor.

4. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing for every 2 moles of said ester approximately 4 moles of said polyethylene glycol to a temperature and for a time substantially to effect the said generation of water, and by removing from the mass the resulting water in the form of vapor.

5. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing for every 2 moles of said ester up to 4 moles of said polyethylene glycol to a temperature and for a time substantially to effect the said generation of water, and by removing from the mass the resulting water in the form of vapor.

6. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing said ester and polyethylene glycol to raise its temperature to initiate said generation of water, by removing from the mass the resulting water in the form of vapor, by continuing the application of heat and raising the temperature after said initiation of said generation of water, and by cooling the mass at any time thereafter.

7. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing for every 2 moles of said ester from 2 to 4 moles of said polyethylene glycol to raise its temperature to initiate said generation of water, by removing from the mass the resulting water in the form of vapor, by continuing the application of heat and raising the temperature after said initiation of the said generation of water, and by cooling the mass when at least 2 moles of water per 2 moles of said ester have been generated.

8. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing for every 2 moles of said ester at least 2 moles of said polyethylene glycol to raise its temperature to initiate said generation of water, by removing from the mass the resulting water in the form of vapor, by continuing the application of heat and raising the temperature after said initiation of said generation of water, and by cooling the mass when at least 2 moles of water per 2 moles of said ester have been generated.

9. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing for every 2 moles of said ester approximately 4 moles of said polyethylene glycol to raise its temperature to initiate said generation of water, by removing from the mass the resulting water in the form of vapor, by continuing the application of heat and raising the temperature after said initiation of the said generation of water, and by cooling the mass when 2 moles of water per 2 moles of said ester have been generated.

10. The process which comprises chemically condensing the essential ingredients of an anhydrous mixture comprising essentially polyethylene glycol and cholesteryl ester of saturated straight-chain monocarboxylic aliphatic acid having from 12 to 18 inclusive carbon atoms, while effecting elimination of water of condensation generated by chemical action, by heating said mixture containing for every 2 moles of said ester up to 4 moles of said polyethylene glycol to raise its temperature to initiate said generation of water, by removing from the mass the resulting water in the form of vapor, by continuing the application of heat and raising the temperature after said initiation of the said generation of water, and by cooling the mass at a time when at least ½ mole of water has been generated for each mole of said glycol employed.

11. The process which comprises chemically condensing the essential ingredients of an anhydrous mixture comprising essentially (1) polyethylene glycol having an average molecular weight ranging upwardly from about 1500, and (2) cholesteryl ester of saturated straight-chain monocarboxylic aliphatic acid having from 12 to 18 inclusive carbon atoms, said glycol and said ester being present in substantially equimolecular quantities, while effecting elimination of water of condensation generated by chemical action, by heating said mixture containing said ester and said glycol to a temperature and for a time substantially to effect the generation of 2 to 6 moles of water per 2 moles of said ester, and by removing from the mass the resulting water in the form of vapor.

12. The process which comprises chemically condensing the essential ingredients of an anhydrous mixture comprising essentially (1) polyethylene glycol having an average molecular weight ranging upwardly from about 1500, and (2) cholesteryl ester of saturated straight-chain monocarboxylic aliphatic acid having from 12 to 18 inclusive carbon atoms, said ester and said glycol being present substantially in the ratio of 2 to 4 moles of glycol to 2 moles of ester, while effecting elimination of water of condensation generated by chemical action, by heating said mixture containing said ester and said glycol to a temperature and for a time substantially to effect the said generation of water, by removing from the mass the resulting water in the form of vapor, and cooling the mass at a time when at least 2 moles of water per 2 moles of said ester have been generated.

13. The process which comprises chemically condensing the essential ingredients of an anhydrous mixture comprising essentially (1) polyethylene glycol, and (2) cholesteryl ester of saturated straight-chain monocarboxylic aliphatic acid having from 12 to 18 inclusive carbon atoms, said ester and said glycol being present substantially in the ratio of 2 to 4 moles of glycol to 2 moles of ester, while effecting elimination of water of condensation generated by chemical action, by heating said mixture containing said ester and said glycol to a temperature and for a time substantially to effect the said generation of water, by removing from the mass the resulting water in the form of vapor, and cooling the mass at a time when at least 2 moles of water per 2 moles of said ester have been generated.

14. The process which comprises chemically condensing the essential ingredients of an anhydrous mixture comprising essentially (1) polyethylene glycol, and (2) cholesteryl ester of saturated straight-chain monocarboxylic aliphatic acid having from 12 to 18 inclusive carbon atoms, said glycol and said ester being present substantially in the ratio of 4 moles of glycol to 2 moles of ester, while effecting elimination of water of condensation generated by chemical action, by heating said mixture containing said ester and said glycol to a temperature and for a time substantially to effect the said generation of water, by removing from the mass the resulting water in the form of vapor, and cooling the mass at a time when a quantity of water in the range from 2 to 8 moles per 2 moles of said ester has been generated.

15. The process which comprises chemically condensing the essential ingredients of an anhydrous mixture comprising essentially (1) polyethylene glycol, and (2) cholesteryl ester of saturated straight-chain monocarboxylic aliphatic acid having from 12 to 18 inclusive carbon atoms, said glycol and said ester being present substantially in the ratio of 2 to 4 moles of glycol to 2 moles of ester, while effecting elimination of water of condensation generated by chemical action, by heating said mixture containing said ester and said glycol to a temperature and for a time substantially to effect the said generation of water, by removing from the mass the resulting water in the form of vapor, and cooling the mass at a time when from 2 to 8 moles of water per 2 moles of said ester have been generated.

16. The product made by the process of claim 14.

17. The product made by the process of claim 9.

18. The product made by the process of claim 14 when forming and removing 4 moles of water per 2 moles of the ester.

19. The product made by the process of claim 11 when forming and removing 2 moles of water per 2 moles of the ester.

20. The product made by the process of claim 11 when forming and removing 6 moles of water per 2 moles of the ester.

21. The product made by the process of claim 11.

LOUIS L. LERNER.

REFERENCES CITED

The following references are of record in the file of this patent:

UNITED STATES PATENTS

| Number | Name | Date |
|---|---|---|
| 1,970,578 | Schoeller | Aug. 21, 1934 |
| 2,185,969 | Schultze | Jan. 2, 1940 |